F. FLEMING.
COMBINED DRILL AND STAY BOLT CUTTER.
APPLICATION FILED MAY 7, 1908.
941,568.
Patented Nov. 30, 1909.
2 SHEETS—SHEET 1.
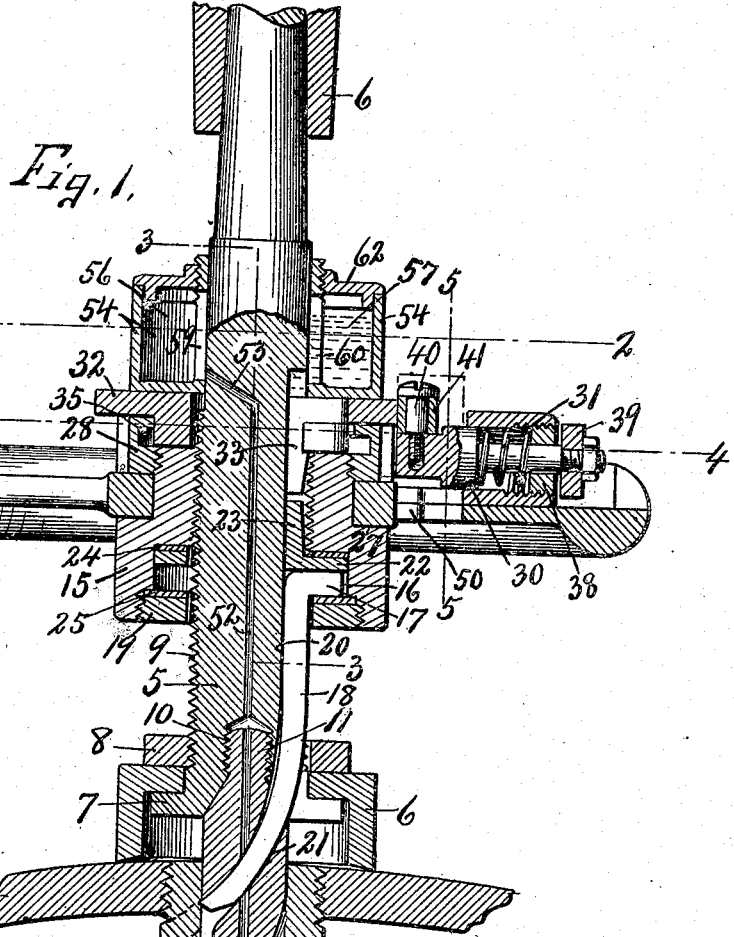
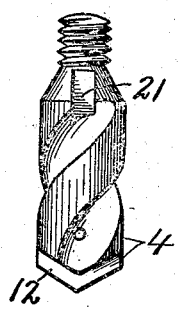
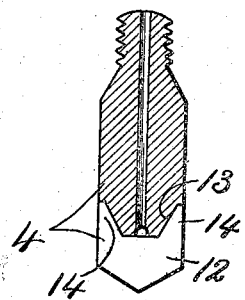
Witnesses.
Inventor.
F. Fleming
By.
Howard P. Denslow
Attorney.

F. FLEMING.
COMBINED DRILL AND STAY BOLT CUTTER.
APPLICATION FILED MAY 7, 1908.
941,568.
Patented Nov. 30, 1909.
2 SHEETS—SHEET 2.
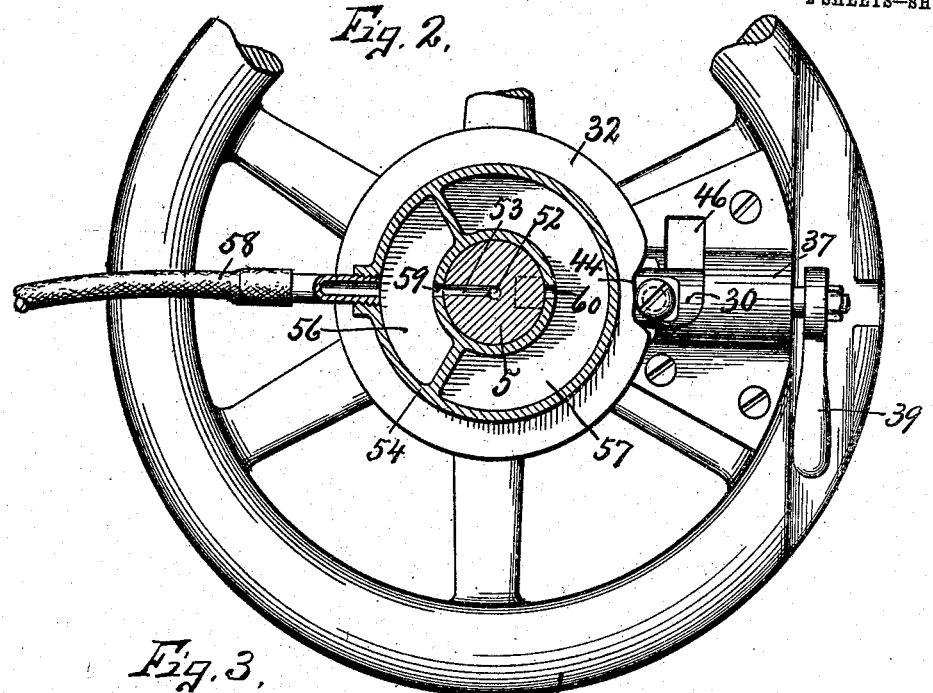
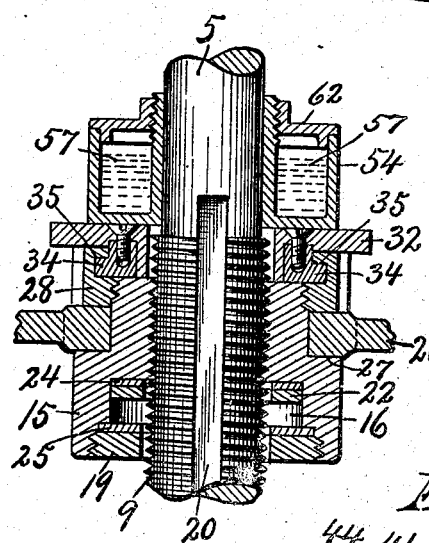
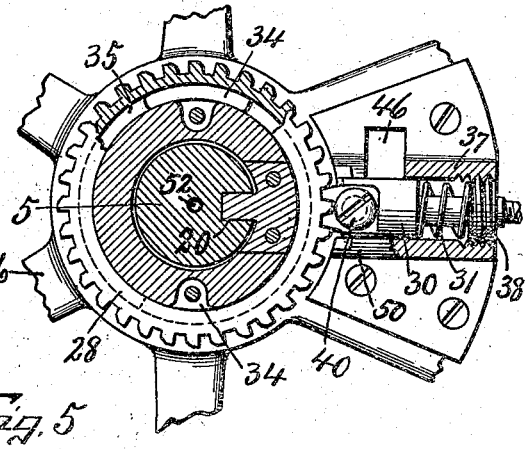
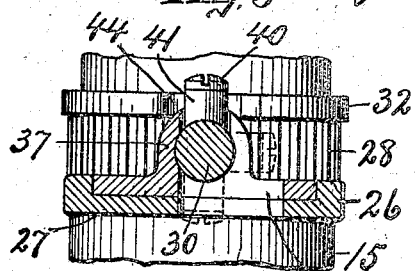
Witnesses.
F. C. Thomas
H. E. Chase
Inventor.
F. Fleming
By.
Howard P. Denslow
Attorney.

UNITED STATES PATENT OFFICE.

FRANK FLEMING, OF ROME, NEW YORK.

COMBINED DRILL AND STAY-BOLT CUTTER.

941,568.

Specification of Letters Patent.   Patented Nov. 30, 1909.

Application filed May 7, 1908.   Serial No. 431,404.

*To all whom it may concern:*

Be it known that I, FRANK FLEMING, of Rome, in the county of Oneida, in the State of New York, have invented new and useful Improvements in Combined Drills and Stay-Bolt Cutters, of which the following, taken in connection with the accompanying drawings, is a full, clear, and exact description.

This invention relates to certain improvements in combined drill and stay bolt cutters of the class set forth in my Patent No. 869,628, dated October 29, 1907, upon which my present device is an improvement, and involves the use of a rotary threaded spindle which is adapted to be attached to any rotary power or hand-driven drill press or similar machine, capable of advancing and withdrawing the spindle to and from the work in combination with a nut engaging the threaded portion of the spindle and a suitable cutting tool operable by the nut independently of and relatively to the spindle for the purpose of cutting the stay bolts, tubes or flues of boilers and similar shells from the exterior where it is impracticable to perform a similar operation from the interior of the shell.

In addition to the broad object of providing a device applicable to the exterior of a shell for cutting stay bolts, tubes, and similar elements close to the interior of the shell as set forth in my patent referred to:

My further object is to equip the same device with means for drilling the hole in the stay bolt from the exterior inwardly and with additional mechanism for establishing an automatic intermitting or continuous feed of the stay bolt cutter into the work under the control of the operator.

A further object is to provide the drill spindle with a removable drill point so that such point may be removed and replaced with a new one without necessitating the replacement of the entire drill.

Other objects and uses relating to specific parts of the device will be brought out in the following description.

In the drawings—Figure 1 is a central vertical sectional view of a combined drill and stay bolt cutter embodying the various features of my invention as shown in operative position for cutting a stay bolt of a boiler, portions of which are shown in section. Figs. 2, 3, 4 and 5 are sectional views taken respectively on lines 2—2, 3—3, 4—4, and 5—5, Fig. 1, the spindle being shown in elevation in Fig. 3. Figs. 6 and 7 are respectively an elevation and sectional view of the drill which is detachably secured to the drill spindle.

In Fig. 1 is shown a portion of a shell or boiler —1— and a portion of a stay bolt —2— rigidly secured thereto and provided with a socket —3— opening from the exterior of the shell and formed by a drill —4— which is detachably secured to and rotates with a rotary spindle —5—, the upper end of said spindle being tapered and secured in a suitable chuck —6— of a drill press or other suitable device whereby the spindle —5— with the drill —4— may be moved axially in opposite directions in the usual manner for drill presses.

A bearing collar —6'— is loosely mounted upon the lower end of the spindle —5— between suitable shoulders —7— and —8—, the shoulder —7— being preferably integral with the spindle while the shoulder —8— consists of a nut engaged with a threaded portion —9— of the spindle to hold the bearing collar —6'— against undue upward movement. The collar —6'— incloses and extends some distance below the flange —7— for engaging the outer face of the boiler —1— around the adjacent face of the stay bolt —2— to limit the movement of the drill section —4— into the work or rather into the stay bolt —2— to determine the depth of the socket —3—. This drill section —4— is detachably secured to the lower end of the spindle —5— and for this purpose, said spindle is provided with a threaded socket —10— opening from its lower end while the drill section —4— is provided with a nipple —11— which is screwed into the socket —10—, the portion of the drill section —4— just below the threaded nipple —11— being tapered to closely fit a similar taper forming the lower end of the socket —10— thereby affording a broad bearing and tight fit between the drill section —4— and spindle —5— and at the same time permitting such drill section to be removed if desired.

By this construction I am enabled to use a comparatively short twist drill of just sufficient or slightly greater length than the socket —3— which it may be desired to drill in the stay bolt —2— but in practice I preferably provide the lower end of the drill section —4— with a removable drill point —12— consisting of a highly tempered or hardened metal plate which is snugly fitted in a transverse slot —13— extending upwardly from the lower end of the drill section —4— and of slightly less vertical length than the plate —12— so as to cause the lower end of said plate to protrude some distance beyond or below the lower end of the drill section in order to more effectively cut into the work.

The object of making this drill point removable is to reduce the cost and labor of grinding or repairing the drill because by the use of the comparatively small drill point —12— it may be more perfectly tempered or hardened and is therefore better adapted to withstand the strains to which it is subjected in forming the socket —3—.

In order that the plate —12— may be made as small as possible and still have ample bearings in the drill section —4—, I provide the opposite ends of the plate —12— with upwardly extending wings —14— which fit in corresponding grooves in the drill section —4— thereby affording greater resistance to twisting or bending of the plate and at the same time relieving the adjacent portion of the drill section from undue torsional strains.

As previously intimated the object of the collar or bearing —6'— is to limit the degree of movement of the drill into the stay bolt and at the same time to steady the action of the drill when entering the work and for this purpose, said collar is loosely mounted between the shoulders —7— and —8— so that when frictionally engaged with the exterior of the shell —1— it may be held against rotation during the turning of the spindle —5—, the nut —8— being adjusted so as to allow the spindle —5— to turn without turning the bearing collar —6'—.

The threaded portion —9— of the spindle —5— extends upwardly some distance from the lock nut —8— and is engaged by a threaded collar or nut —15— having an annular socket —16— opening from its under side and of greater diameter than the exterior diameter of the adjacent portion of the threaded spindle —5— for receiving the upper offset end —17— of a stay bolt cutter —18—, the lower end of the socket —16— being enlarged and threaded for receiving a threaded bushing or nut —19— which engages the under side of the offset —17— and holds the stay bolt cutter against undue downward movement relative to the collar —15—. This stay bolt cutter —18— is locked to rotate with the spindle —5— and for this purpose constitutes what may be termed a key which fits into a suitable lengthwise way —20— in one side of the spindle —5— as best seen in Fig. 1, the upper portion of said cutter being comparatively straight while its lower portion is curved downwardly and laterally through a curved slot or way —21— forming a continuation of the key way —20— and extending through the opposite side of the drill section —4— so that when the drill section has performed its work of drilling the socket —3—, the cutter —18— may be moved laterally in its ways —20— and —21— by the rotation of the nut —15— to cause the extreme lower end of the cutter —18— to cut its way through the adjacent portion of the stay bolt —2— close to the inner side of the shell —1—. The cutter —18— is prevented from undue upward movement relative to the collar —15— by contact with a horizontal annular flange —22— which is inserted in the upper end of the socket and is provided with a fin —23— which enters the key way —20— to lock the flange —22— to rotate with the spindle —5—. This flange —22— affords a broad bearing for the upper end or offset —17— of the cutter —18— and not only allows the latter to be deflected from its starting position while entering the work but is usually hardened to better resist end thrust against the tool when impelled downwardly through the stay bolt, said flange resting against a suitable washer —24— which in turn bears against the superposed reduced portion of the collar —15— forming the upper end of the socket —16—, a similar hardened washer —25— being interposed between the bushing —19— and adjacent face of the offset —17— to reduce the friction and wear between the contacting parts.

The threads —9— of the spindle —5— are preferably of left hand pitch so that when the spindle is rotating from right to left as for drill spindles and the nut —15— is held by hand or otherwise against rotating therewith, said nut will be automatically forced downwardly by the threads thereby feeding the cutting tool —18— downwardly and laterally while the spindle with the cutter therein is rotating to gradually cut through the stay bolt just within the shell —1— as shown by dotted lines in Fig. 1.

The nut —15— is, therefore, rotatable or rather adapted to be held against rotation independently of the spindle —5— and cutting tool keyed thereto but when so held it is clearly evident that it will be moved downwardly and may be returned to its normal up position by simply rotating it in the direction of rotation of the spindle but at a greater rate of speed or when the spindle has ceased rotation at the end of the cutting operation which may be brought about by stopping the machine at the end of the cutting operation.

It is desirable at times to provide for the intermitting automatic feed downwardly into the work and at other times it may be desired to make this feeding operation continuous instead of intermitting and for this purpose a hand wheel —26— is loosely journaled upon a reduced upper portion of the nut or collar —15— and is held against endwise movement between a shoulder —27— integral with the collar —15— and a screw threaded collar or nut —28— which is screwed upon a threaded upper extremity of the collar —15— and engages the upper face of the hub of the hand wheel —26— as best seen in Figs. 1 and 3.

The nut —28— is provided upon its periphery with ratchet teeth which are adapted to be engaged by a sliding pawl —30—, the latter being forced to its operative position by a suitable spring —31—.

A cam disk —32— is loosely mounted upon the upper end of the ratchet collar —28— and is locked to and rotates with the spindle —5— by a key —33— which is seated in the key way —20— forming a continuation of the key way which receives the tool —18—, said cam disk having a reduced central portion loosely fitting within the upper portion of the ratchet collar —28— and against the upper face of the collar or nut —15— where it is held against upward displacement by separate flanged lugs —34— which enter corresponding annular grooves —35— on the inner face of the ratchet collar —28— and allows the spindle with the cam disk —32— locked thereto to rotate when the collar —15— is held against rotation under which conditions the collar —15—, wheel —26—, cam —32— together with the cutting tool —18— are fed downwardly by the left hand screw thread —9—.

The pawl —30— consists of a radially movable plunger guided in a suitable hollow boss or frame —37— which is rigid upon or integral with the hand wheel —26—, said pawl having its inner end provided with one or more teeth movable into and out of mesh with the teeth of the ratchet wheel —28— while its outer end is reduced in diameter and is guided in a threaded bushing —38— which is screwed into the outer end of the hollow boss —37—.

The spring —31— is interposed between this bushing —38— and inner enlarged head of the pawl —30— and tends to force said pawl inwardly to engage its teeth with those of the ratchet —28— when not held outwardly against the action of the spring. This pawl —30— is adapted to be drawn outwardly against the action of the spring —31— by means of a hand piece —39— which also serves as a means for rotating the pawl —30— upon its axis when its teeth are disengaged from those of the ratchet wheel —28— for a purpose hereinafter described. This pawl is provided on its inner end with a radial projecting stud —40— upon which is mounted an anti-friction roller —41— riding against the periphery of the cam disk —32— when adjusted to the position shown in Figs. 1, 2, 4 and 5 for intermittingly feeding the cutting tool —18— downwardly into the stay bolt —2— when the hand wheel —26— is held against rotation and for this purpose the greater portion of the disk —32— is circular but is provided with one or more comparatively short cut outs or recesses —44—, the circular portion of the periphery of the disk —32— riding against the roller bearing —41— operating to force the teeth of the pawl out of mesh with those of the ratchet wheel —28— but when the cut out —44— is registered with the roller —41—, it allows the spring —31— to force the pawl inwardly to engage its teeth with those of the ratchet wheel —28— thereby temporarily locking the hand wheel —26— to the nut or collar —15— so that when the hand wheel —26— is held by hand against rotation in the manner previously described, the nut will also be held against rotation through a short interval or while the recess —44— is registered with the roller —40—, it being understood that at all other times the hand wheel is free and may be easily held by the hand against rotation while the nut or collar —15— continues to rotate with the spindle —5— but does not effect any downward movement of the collar —15— except when such nut is held against rotation in the manner just pointed out.

During the drilling operation when it is simply necessary to rotate the spindle —5— without advancing the stay bolt cutter —18— into the work, it is desirable to rock the pawl —30— out of engagement with the ratchet wheel —38— and for this purpose the pawl with the stud —40— thereon may be drawn backwardly by the hand piece —39— against the action of the spring —31— and rotated about a quarter turn on its axis to engage the roller stud —40— in a radial slot —46— in the frame —37— at one side of the plunger or pawl —30— whereby said pawl is held against the action of the spring —31— with its teeth out of engagement with the ratchet wheel —28— leaving the hand wheel free to be held against rotation to steady the action of the drill during the drilling operation.

It is sometimes desirable to lock the hand wheel —26— to the ratchet wheel —28— so that by holding the wheel —26— by hand against rotation, the ratchet wheel will be held against such rotation and cause the threads —9— to feed the collar —15— and cutting tool —13— downwardly to cause the latter to cut through the stay bolt —2— and for this purpose I provide the hand wheel with an additional slot —50— of sufficient radial length to permit the roller —41—to be locked out of the plane of the cam —32— and into the slot —50— which is of sufficient radial length to permit the pawl —30— to be forced into engagement with the teeth of the ratchet wheel —28— whereupon the collar —15— will be locked to the hand wheel —26— so that by holding the hand wheel against rotation the collar or nut will be held thereby causing the threads —9— to feed the collar with the cutting tool —18— thereon downwardly while the spindle is being rotated downwardly to gradually cut radially through the stay bolt from the inside. During this cutting operation more or less of the chips tend to accumulate at the cutting edge of the tool —18— and in order that these chips may be properly removed and a suitable quantity of oil may be introduced at the cutting point, I provide the spindle —5— with a lengthwise passage —52— having its upper end terminating in a lateral passage —53— and communicating with the interior of the cylinder cup —54— while its lower end is continued through the drill section terminating below the cutting tool —18— in a branch passage —55— extending radially through the drill section —4— just above or in registration with the upper edge of the intermediate portion of the drill point —12— to allow oil and air to be forced through the passage —52— and on to the drill point and at the same time the branch passage —55— affords means for the entrance of a suitable drift tool whereby the drill point —12— may be loosened from its seat and removed from the drill section —4— when it is desired to remove it.

The cylinder cup —54— as best seen in Fig. 2 is provided with separate compartments —57— and —56—, one of which as the compartment —56— serves as an air chamber and is permanently connected to an air supply tube —58— which may be connected to any source of compressed air, not shown. This cylinder —54— is non-rotatable and is provided with a central hub through which the shaft or spindle extends and is free to rotate therein, said hub being provided with diametrically opposite branch passages —59— and —60— communicating respectively with the air and oil compartments —56— and —57— and are located in the path of movement of the outer extremity of the branch passage —53— so that as the spindle —5— is rotated this branch passage is alternately brought into communication with the air compartment —56— and oil compartment —57— through the branch passages —59— and —60—, respectively.

It is evident from the foregoing description that air will be forced through the channel —52— and branch passage —55— during a part of the revolution of the spindle while during the remaining part of such revolution, oil will be forced by gravity or otherwise through the same passage and find exit at the cutting point of the tool —18— and also at the drill points, the latter being provided with spiral grooves similar to the ordinary twist drill which allow ample clearance for the collection of chips away from the drill point.

The cylinder —54— is closed at the top by a screw cap —62— which is screwed upon a threaded upper portion of the central hub as best seen in Fig. 3 and forms practically air tight compartments for the air and oil and at the same time affords means for supplying the air chamber —57— with oil.

The operation briefly described is as follows: Assuming that it is desired to cut or sever an ordinary stay bolt from the shell in which it is secured, in which case the pawl —30— is drawn out of engagement with the ratchet wheel —28— and held in such position by turning the pawl so as to bring the roller bearing —41— into the slot —46— of the frame —37— which holds the pawl in its adjusted position, then under such conditions the hand wheel —26— is free and may be held against rotation to steady the action of the drill. The drill point is then brought against the outer end of the stay bolt and the drill spindle gradually depressed in the usual manner for drill presses. This drilling operation is continued until the stop collar —6— engages the outer face of the shell which limits the further movement of the drill inwardly. Having now drilled the hole to the proper depth in the outer end of the stay bolt, the pawl —30— is again adjusted either to the position shown in Figs. 1, 2, 4 and 5 for intermitting feeding action or with the roller —41— into the slot —50— for continuous feeding. When in the position shown in Figs. 1, 2, 4 and 5 for intermitting feeding action, the hand wheel —26— is held against rotation being free from interlocking connection with the nut —15— while the circular portion of the cam disk —32— is in engagement with the roller —41— but as the recess —44— is registered with the roller —41— at each revolution of the disk by the spindle —1—, the spring —31— forces the pawl into engagement with the ratchet thereby locking the wheel —26— to the nut —15— which causes a slight temporary down feed of the cutting tool —18— at each revolution of the spindle. If it is desired to make this feed continuous the roller —41— is thrown out of engagement with the cam —32— and into the slot —50— which allows the spring —31— to press the pawl 30 into engagement with the ratchet wheel thereby establishing a locking connection between the hand wheel —26— and collar —15— and by holding the wheel —26— by hand against rotation the collar —15— will be similarly held causing these parts together with the tool —18— to feed downwardly continuously against the rotation of the spindle.

It is evident from the foregoing description that this device is particularly simple and affords means for expeditiously severing the stay bolt from the shell to which it is secured.

What I claim is:

1. In a machine for cutting stay bolts, a rotary spindle having a drill, said spindle and drill having registering lengthwise slots, the slot in the drill extending through one side thereof, a cutter movable lengthwise in said slots, and means for moving the cutter.

2. In a machine for cutting stay bolts, a rotary spindle, a drill removably secured to the spindle, said spindle and drill having registering lengthwise slots, the slot in the drill extending through one side thereof, a cutter movable lengthwise in the slots and keying the drill to the spindle, and means for moving the cutter endwise.

3. In a machine for cutting stay bolts, a rotary spindle having a lengthwise slot in one side, a drill screwed to the spindle and having a lengthwise slot extending transversely therethrough and registered with the first named slot, a cutter in said slots, and means for moving the cutter endwise.

4. In a machine for cutting stay bolts, a rotary drill spindle, and a chambered member surrounding a portion of the spindle and provided with an air chamber and an oil chamber, said spindle having a lengthwise passage alternately communicating with said chambers as the spindle is rotated.

5. In a machine for cutting stay bolts, a rotary threaded spindle having a lengthwise groove, a drill secured to the spindle and having a transverse slot therethrough registered with said groove, a cutter in said groove and slot, a nut rotatable on the threaded portion of the spindle and rotatable independently thereof, and means actuated by the nut for moving the cutter endwise.

6. In a machine for cutting stay bolts, a rotary threaded spindle, a drill secured to the spindle and provided with a transverse slot therethrough, a cutter in the slot, and a nut rotatable on the threaded portion of the spindle and connected to said cutter for moving the latter endwise.

7. In a machine for cutting stay bolts, a rotary threaded spindle, a drill secured to the spindle and provided with a transverse slot therethrough, a cutter in the slot, a nut rotatable on the threaded portion of the spindle, connections between the nut and cutter for moving the cutter endwise as the nut is rotated on the spindle, and means for holding the nut against rotation with the spindle.

8. In a machine for cutting stay bolts, a rotary threaded spindle, a drill secured to the spindle and provided with a transverse slot therethrough, a cutter in the slot, a nut rotatable on the threaded portion of the spindle, connections between the nut and cutter for moving the cutter endwise as the nut is rotated on the spindle, a handwheel loosely mounted on the nut, and means for locking the hand-wheel to the nut whereby the wheel and nut may be held by hand against rotation with the spindle.

9. In combination with a rotary threaded spindle, a cutter rotating with the spindle and movable transversely of its axis, a threaded collar engaging the threaded portion of the spindle, a hand piece loose on the collar, and means for locking and unlocking the hand piece to and from the collar.

10. In combination with a rotary spindle having a transverse guide disposed at an angle with its axis, a cutting tool movable in said guide, a collar movable lengthwise of the spindle and engaged with said cutting tool for operating the same, means for imparting axial movement of the collar from the rotating spindle, a hand piece rotatable independently of the collar, and means for locking and unlocking the hand wheel to and from the collar.

11. In combination with a rotary spindle, a cutter movable lengthwise and transversely of the spindle and rotating therewith, a threaded collar engaging the threaded portion of the spindle and connected to said cutter for moving the latter axially as the collar is rotated upon the spindle, a hand piece loosely mounted upon the collar to rotate independently thereof, a ratchet wheel secured to the collar, a pawl mounted upon the hand piece and movable into and out of engagement with the teeth of the ratchet wheel, and a cam rotating with the spindle independently of the collar for intermittently forcing the pawl out of engagement with the ratchet wheel.

12. In combination with a rotary threaded spindle, a threaded collar engaging the threaded portion of the spindle and rotatable independently thereof, a cutter movable transversely of the spindle and actuated by said spindle, a hand piece loosely mounted upon the collar, means for locking the hand piece to the collar, and addition means rotating with the spindle for intermittently breaking the locking connection between the hand piece and collar.

13. In combination with a rotary threaded spindle, a threaded collar engaging the threaded portion of the spindle and rotatable independently thereof, a cutter movable transversely of the axis of the spindle and actuated by said collar, a toothed member secured to the collar, a hand piece rotatable with the spindle and collar but adapted to be held by hand against such rotation, a locking member on the hand piece movable into and out of engagement with the teeth of the toothed member, and means for holding the locking member out of engagement with the ratchet wheel.

In witness whereof I have hereunto set my hand this 2nd day of May 1908.

FRANK FLEMING.

Witnesses:
H. E. CHASE,
C. M. McCORMACK.